Patented Jan. 13, 1931

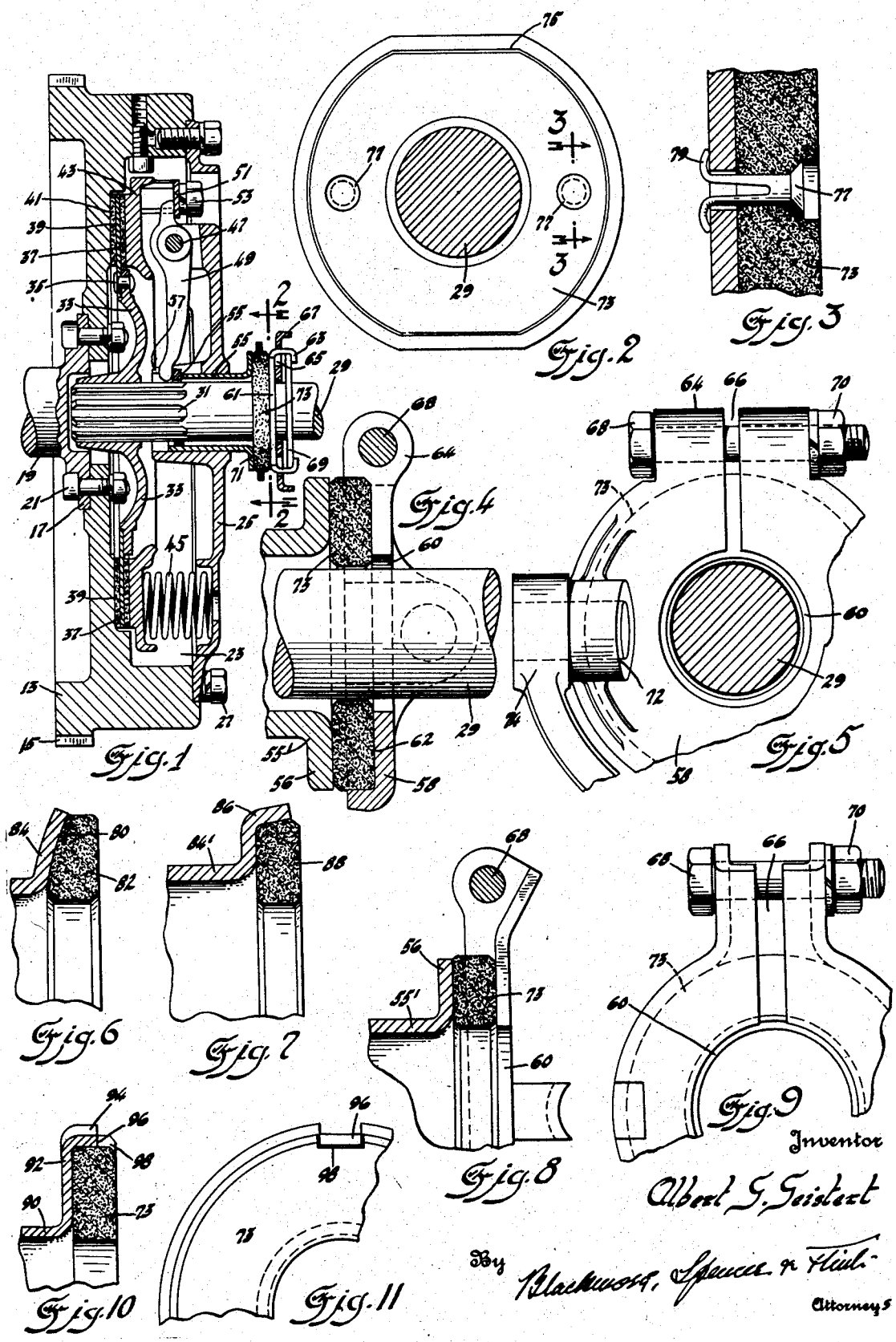

1,788,864

UNITED STATES PATENT OFFICE

ALBERT G. GEISTERT, OF DETROIT, MICHIGAN, ASSIGNOR TO GENERAL MOTORS CORPORATION, OF DETROIT, MICHIGAN, A CORPORATION OF DELAWARE

CLUTCH-THROW-OUT BEARING

Application filed June 13, 1927. Serial No. 198,486.

This invention relates to clutches, and has been designed more especially as an improvement in a clutch for motor vehicles.

The object of the invention is to improve the throw out bearing; more particularly the invention aims to make use of a solid self-lubricating anti-friction bearing and to provide means whereby the latter is secured against rotation relative to one or the other of the relatively rotating parts.

Several specific forms have been designed to carry out the inventive idea.

Figure 1 shows a motor vehicle clutch, the figure being a transverse section on a line diametrically through the fly wheel with which the clutch is associated.

Figure 2 is a section on line 2—2 of Figure 1.

Figure 3 is a section on line 3—3 of Figure 2.

Figure 4 illustrates a second form, the view being a section transversely through the clutch collar.

Figure 5 is a view in elevation of the form of invention illustrated in Figure 4.

Figure 6 shows a sectional detail of a third form.

Figure 7 illustrates a fourth form, also in sectional detail.

Figure 8 shows in transverse section a fifth form of the invention.

Figure 9 illustrates in elevation this same fifth form.

Figure 10 is a sectional detail of still another, a sixth form, in which the invention may be embodied.

Figure 11 is a view of the form shown in Figure 10 in elevation.

Prior to this, my invention, it has been proposed to use a sleeve rotatable with the fly wheel member of the clutch and axially slidable to release the clutch engagement. Together with such a sleeve there has been used an axially slidable but non-rotatable collar, manually operable means as a lever being used to move the sleeve. To lessen friction there have been used anti-friction bearings between the sleeve and collar. In at least one such prior organization of parts a solid self-lubricating carbon-graphite bearing has been used between the collar and sleeve. In such arrangements the bearing has been free to rotate relative to both sleeve and collar. Such free mounting of the bearing member has certain disadvantages and is a source of noise.

I have found it desirable to anchor such a carbon-graphite bearing to one or the other of these parts, the collar or the sleeve, so that it shall rotate with said part. I also prefer to fasten the bearing to said part for the purpose of permitting the assembly of the bearing and part as a unit. I have found that the best results are to be had when the carbon graphite bearing revolves in contact with a finished cast iron surface. To obtain these results the several arrangements herein described and shown on the accompanying drawing are effective.

In Figure 1 is shown a fly wheel 13 having teeth 15 for engagement with the starter mechanism. The fly wheel may be secured to a flange 17 on the engine shaft 19 by bolts 21. The fly wheel is formed with a recess 23 and this recess is covered by a plate 25 secured to the fly wheel by a plurality of bolts 27. 29 represents a driven shaft having its forward end provided with splines 31 holding a hub portion 33 of the driven member of the clutch. This hub portion is secured by means of rivets 35 to an annular driven member 37 having friction rings 39 on each side thereof. One of these friction rings 39 engages a friction face 41 on the fly wheel. The other friction disc engages an annular portion of a pressure plate 43. It will be understood that radial movement of the pressure plate toward the fly wheel produces a frictional clutching engagement between the driven member 37 and the driving faces of the fly wheel and pressure plate. To secure this frictional contact a plurality of springs are positioned between the pressure plate and the plate 25, one such spring being represented in the drawing by numeral 45.

Means must be provided to overcome the pressure of the spring and withdraw the pressure plate from the driven clutch member 37. To that end there is provided on the plate 25 an inwardly directed lug to which is pivoted by a pivot pin 47 a lever 49. The lever projects radially beyond pin 47 and engages a bridge member 51 carried by a fastening means 53 on the pressure plate 43. Slidable through a central opening in plate 25 is a sleeve 55 with notches cut in its inner end as at 57 for engagement with the inner ends of the levers 49. There are a plurality of these levers distributed radially about the clutch, the drawing showing but one of them. For the purpose of sliding the sleeve 55 inwardly there is provided a collar 61 having inturned lugs 63 extending through openings 65 in the end 67 of an operating lever. Suitable means such as a spring 69 may be used to hold the lever and the collar in assembled relation.

For the purpose of providing an anti-friction bearing between the collar and sleeve the end of the collar adjacent the sleeve is formed with a recess 71 into which is inserted the carbon-graphite bearing 73. The bearing member and the recessed portion of the sleeve are formed with flats, as shown at 75 in Figure 2, to prevent the relative rotation of the bearing in the sleeve. For convenience in assembly split rivets 77 are used, two such being shown in Figure 2. These rivets are passed through the bearing as shown in Figure 3 through the flange of the sleeve 55 and their ends are outturned as at 79 to secure these parts together.

Figures 4 and 5 illustrate a second form of embodiment of the invention. In this second form the bearing member is carried by the collar instead of by the sleeve. The sleeve member is represented by numeral 55'. It has a radial flange 56. The collar member is represented by numeral 58. It is formed with a central opening 60 surrounding the driven shaft 29 and with a recess 62 into which the bearing member is placed. The collar is formed with lugs 64 separated by a slot 66 extending into the central opening 60. The lugs 64 are apertured for the reception of a bolt 68. By tightening the bolt 68 by means of its nut 70 the collar is securely clamped upon the bearing member. This collar is provided with diametrically opposite eyes 72 registering with openings in the extended ends of an operating lever 74. Pivotal movement of the lever 74 effects an axial movement of the collar 58 in the act of releasing the clutch. It is preferred that the sleeve 55' shall be of cast iron and shall have finished surface engaging the bearing member.

Figure 6 illustrates a form of the invention wherein the bearing member is given a spherical surface 80 and a flat surface 82. The sleeve 84 is spherically shaped to correspond with the shape of the bearing member. In this form of the invention the bearing member may be clamped in the collar and its spherical surface centers itself in the cast iron sleeve. The purpose of this spherical surface is, of course, to insure proper alignment of the parts.

In the form of the invention shown by Figure 7 the collar 84' is formed with a radial flange having a small degree angle as at 86. In the recess formed by this angular portion 86 is received the bearing member 88 and it is intended that the wedging action shall hold the bearing member fixed from rotation relative to the sleeve. If desired, a collar of the type shown in Figure 1 may be used with this form of the invention.

In Figure 8 the sleeve is substantially the same as sleeve 55' of Figure 4 and is designated by the same reference character. The bearing is also substantially like the bearing of Figure 4. In this form the clamp collar is formed as a stamping. The stamping is formed with a recess which corresponds to the recess portion of collar 58 of Figure 5. The outwardly extended lugs are made use of in this form and the bolt 68 and nut 70 serve to close the recess 66 and clamp the bearing member in the collar.

In Figures 10 and 11 is shown still another form of the invention. In this form the sleeve 90, having a flange 92, has a turned up rim 94 to receive the bearing member 73. This sleeve is to be formed of pressed steel and has one or more lugs sheered in the rim as at 96 to engage slots 98 in the bearing 73. In this form of the invention the bearing may be secured to the sleeve by "smooth-on" cement and rotation may be prevented by the lugs 96.

I claim:

In a clutch having a throw-out device comprising a sliding sleeve and a coaxial sliding collar, one of said parts having an annular recess, a graphitic bearing of annular shape in said annular recess, the peripheral portions of said bearing and recess having flat portions to prevent relative rotation.

In testimony whereof I affix my signature.

ALBERT G. GEISTERT.